United States Patent
Tsenter

(10) Patent No.: US 6,313,605 B1
(45) Date of Patent: Nov. 6, 2001

(54) BATTERY CHARGER AND METHOD OF CHARGING NICKEL BASED BATTERIES

(75) Inventor: Boris Tsenter, Norcross, GA (US)

(73) Assignee: Total Battery Management, Inc., Chamblee, GA (US)

( * ) Notice: Subject to any disclaimer, the term of this patent is extended or adjusted under 35 U.S.C. 154(b) by 0 days.

(21) Appl. No.: 09/456,366

(22) Filed: Dec. 8, 1999

Related U.S. Application Data

(60) Provisional application No. 60/111,393, filed on Dec. 8, 1998.

(51) Int. Cl.[7] .............................. H02J 7/00; H02J 7/04
(52) U.S. Cl. ..................... 320/125; 320/151; 320/153; 320/161; 320/162
(58) Field of Search .................... 320/125, 151, 320/152, 153, 156, 161, 162

(56) References Cited

U.S. PATENT DOCUMENTS

| | | | |
|---|---|---|---|
| 5,055,763 | * 10/1991 | Johnson et al. | 320/125 |
| 5,352,967 | * 10/1994 | Nutz et al. | 320/160 |
| 5,477,127 | * 12/1995 | Shiojima et al. | 320/138 |
| 5,900,718 | * 5/1999 | Tsenter | 320/151 |

FOREIGN PATENT DOCUMENTS

0689275 A1  *  12/1995  (EP) ........................... 320/125

* cited by examiner

Primary Examiner—Gregory J. Toatley, Jr.
(74) Attorney, Agent, or Firm—Benesch, Friedlander, Coplan & Aronoff, LLP; Raymond A. Miller

(57) ABSTRACT

A method of charging a rechargeable battery which comprises charging the battery with a charging current; sampling conditions of the battery during charging to recognize potential adverse conditions within the battery; interrupting the charging current periodically to create current-free periods and sampling an open circuit voltage of the battery during each current-free period to identify potential overcharge conditions in the battery; lowering the charging current if any adverse conditions are identified and continuing charging with the charging current if adverse charging conditions are not identified; and terminating charging when a predetermined value is recognized. The method of charging nickel-metal hydride and nickel-cadmium batteries is based on switching charging current as soon as temperature related battery open circuit voltage reaches the first predetermined value, tapering current and continuing charging up to terminating point.

20 Claims, 6 Drawing Sheets

BATTERY CHARGER AND METHOD OF CHARGING NICKEL BASED BATTERIES

This application claims benefit of Provisional No. 60/111,393 filed Dec. 8, 1998.

BACKGROUND OF THE INVENTION

1. Field of the Invention

This invention relates generally to a battery charger and a method of charging a rechargeable battery specifically Ni—Cd (Nickel-Cadmium), and Ni—MeH (Nickel-Metal Hydride) batteries which utilize predetermined indicia as a signal to terminate charging.

2. Background and Description of the Related Art

Portable electronic devices, e.g. cellular phones, two-way radios, laptop computers and camcorders are in widespread use. Portable electronic devices have also become more common in the aerospace industry. It has become necessary with the growing use of these devices to provide a rechargeable battery that is in a continuous state of operational readiness. In this regard, it is preferable to utilize a rechargeable battery that uses a method of recharging that avoids both under- and overcharging.

Overcharge conditions are undesirable and disadvantageous to the life cycle of the battery. Overcharge reactions in vented cells result in electrolysis and loss of water that must be replaced; in sealed cells, overcharge reactions create pressure and heat since the recombination reactions of gases produced during overcharge are exothermic.

Overcharge reactions that result from high charging voltage may be prevented by simply limiting the charging voltage to a certain value. This simple approach is, unfortunately, only partially successful with cell types, e.g., lead-acid cells, vented Nickel-Cadmium cells, and sealed lithium ion cells.

Despite the adverse consequences of overcharging, in conventional charging methods, overcharge reactions are tolerated to complete the charging process. Sealed cells capable of recombining the overcharge reaction products are able to tolerate overcharge at low rates because the pressures of by-product gases are low and the heat generation is slow enough that the generated heat can be easily dissipated and lost. However, continuous overcharge, even at low rates, reduces the life cycle of the cells.

Rapid charging, i.e., charging in less than one hour, presents much more of a challenge in both vented and sealed cells. The first problem results from the limited rate of charge distribution or equilibration within the electrode plates. Also, at higher charge rates, the overcharge reactions begin to appear at a lower fraction of full charge. When overcharge reactions spear, the efficiency of the charge reactions declines and much of the columbic energy is wasted on the overcharge reactions. The rapid heating of a battery during high-rate overcharge may cause safe pressure limits to be exceeded, as well as cell venting.

There are many different methods for the charging of Ni—MeH and Ni—Cd sealed batteries. Most of these methods use voltage and temperature as parameters for charging termination. The typical voltage termination methods are peak-voltage detection (PVD) or $-\Delta V/\Delta t$. If the battery is charged with varying current, then temperature termination can be used. The PVD method is usable based on the idea of increasing the over voltage of oxygen production on the positive electrode. As soon as this over voltage rises the battery voltage also rises, and the peak voltage is indicated at the onset of oxygen production. Use of PVD as the primary termination method has some undesirable characteristics associated mainly with battery temperature. The oxygen over voltage value is in inverse proportion with temperature and sometimes the peak voltage can be missed. The $-V/\Delta t$ method is not effective for nickel-metal hydride chemistry because there is no significant drop in the chemical polarization value with temperature, but it is a commonly used method for charging termination of Ni—Cd batteries.

The temperature termination methods that can be used are maximum battery temperate, difference between ambient temperate and the battery's temperate ($\Delta T$), or a predetermined value of the first order differential with temperature to time ($\Delta V/\Delta t$). These methods are well known in the art and are based on the phenomena associated with heat production in the process of oxygen consumption on the negative electrode. This method, like any temperature method of charge termination, suffers from inertia. The inertia in termination results in a high final temperature, and the high temperature causes an increase in hydrogen pressure under meal-hydride alloy. As soon as the hydrogen pressure (or mixture of hydrogen oxygen pressure) exceeds the valve release maximum pressure, gas escapes from the bay. The loss of hydrogen-oxygen gas mixes (per one Faraday) equal to the water loss. This is a typical mechanism of electrolyte decomposition in a metal-hydride battery. The electrolyte decomposition causes the battery impedance to rise and therefore the capacity of the battery drops.

U.S. Pat. No. 5,352,967, which is hereby incorporated herein by reference in its entirety, provides a good summary of some of the known methods of charging storage batteries. Most methods of charging sealed NiCad and Ni—MeH batteries use voltage and temperatures as parameters for terminating charging phase. The methods disclosed therein focus on various techniques of determining proper charge termination and include: constant current mode; delta temperature/delta time mode (dT/dt); negative delta voltage charge mode ($-\Delta V$); positive delta voltage or delta voltage/delta time mode (dV/dt); pulse charge mode; and reflex mode.

In the constant current charge mode, the battery is continuously overcharged with a low current. Although the expenditure for a constant current source is relatively low, the long charging time causes damage to the cell. In the constant charge mode, it is customary to restrict the charging time. Therefore, as soon as a selected time has elapsed the charging operation is terminated. Accordingly, since the constant current charge mode does not take into account the charge condition or chemical makeup of the cell, under- or overcharging of the cell can result.

In delta temperature/delta time charging (dT/dt), the charging current is switched off once the cell has reached a predetermined slope in the temperature versus time curve for the cell. This method can generate incorrect termination signals. The charging process may be terminated prior to the battery being fully charged if the preset value of dT/dt is too low, or, conversely, the charging process may be terminated too late if the preset due of dT/dt is too large.

In the negative delta voltage charge mode, a negative slope in the charge curve (dV/dt<0), which appears after complete charging of the battery, is used to terminate charging. The batteries are charged from a constant current source, and the charging voltage rises steadily for as long as the cells are capable of converting the supplied energy into chemical energy. When the cells are no longer capable of storing the supplied energy, the supplied energy is converted into heat, and the cell voltage drops. The drop in the cell voltage is used as an indicator to terminate charge. However, fluctuations in the battery voltage caused by surface effects may be erroneously interpreted as a signal to terminate charge. Therefore, premature break-off of the charging operation is often seen when utilizing the negative delta voltage charge mode. Another problem with negative delta voltage charge mode is that with low rates of charge, the battery does not experience a negative delta voltage in the end of charge. Additionally, Nickel-Metal Hydride batteries do not have the pronounced charging voltage curves seen in Ni—Cd batteries, and as a result, are often overcharged using the negative delta voltage charge mode.

In the positive delta voltage or delta voltage/delta tie mode (dV/dt), the slope of the voltage charging curve is evaluated to determine when to terminate charging of the battery. Theoretically, the rise in the charging voltage decreases when the battery is near full charge. Utilizing a mathematical differential of the charge curve, the reduction in this rise in the charging voltage can be evaluated as the criteria for terminating charging. This method suffers from the fact that the difference in the rise may not be dramatic enough to cause termination of the charging at a proper time with ensuing overcharge of the battery. Additionally, due to fluctuation in the charging curve, this first order derivative charging method may terminate charging prematurely.

The methods described above are based, at least in part, upon the phenomena associated with oxygen production at the nickel oxide electrodes and oxygen consumption at the cadmium electrode (or complementary electrode). Oxygen production causes voltage to peak and creates inflection points. Oxygen consumption on is responsible for heat generation and the decrease of internal impedance, resulting in a decrease in charging voltage. The accompanying rise in temperature can also be used for charge termination. One of the problems with relying on oxygen production as an indicator of charge termination is that oxygen production causes voltage peak and inflection points. To overcome this problem, it has been described in the related art to use certain open circuit voltage parameters as indicators of charge termination.

Pulse charging utilizes a high current charge followed by an interruption period. The interruption period allows the voltage of the battery to be determined during a currentless phase or under open circuit voltage conditions (OCV) in order to determine the open circuit voltage of the battery ($V_{OCV}$).

U.S. Pat. No. 5,477,125, which is hereby incorporated herein by reference in its entirety, proposes a method of recharging a battery that comprises the steps of periodically interrupting the charge current, sampling the resistance free voltage ($V_O$) after the delay period, and determining the point or points on the $V_O(t)$, $dV_O/dt$ and $d^2V_O/dt^2$ curves to detect points indicative of charge termination. The current measuring periods are repeated every 10 seconds, and a delay period after current interruption is used to allow the battery to reach an equilibrium. Tis reference utilizes a pre-set $V_{REF}$ and is may result in a large degree of error due to the fact that the battery rate of charge and design criteria are not generally accounted for when selecting $V_{REF}$.

SUMMARY OF THE PRESENT INVENTION

This invention relates to an improved charging device for rechargeable batteries and cells. More particularly this invention relates to an improved battery charger capable of rapid and "gentle" chart such that adverse overcharging conditions are substantially avoided.

It may be possible to overcome the inertia problem caused by slow rate of temperature flow, because of the inflection point on the charging curve, associated with changing the valence of the nickel-oxide electrode resulting in an increase in unsteady potential. The rise potential in the solid state of nickel-oxide electrode is responsible for changing the shape of the charging curve. This inflection point can be used for choice of voltage references or identification of the state of charge until high rate of oxygen production.

The embodiment of the present invention is directed to a method of charging a rechargeable battery that is comprised of charging the battery with the charging current and then sampling the open circuit volt of the battery. After predetermined indicia have been determined, upon sampling the open circuit voltage of the battery, the charge current is lowered if the open circuit voltage reaches or exceeds the predetermined thermally dependent open circuit voltage ($E_{Thermal}$). If the battery does not teach the predetermined thermally dependent open circuit voltage, then charging is continued until a predetermined charging condition or indicia is identified. This embodiment of the present invention may include the step of monitoring the temperature of the battery over time and using the temperature to determine the increase in temperature over time (+dT/dt). If a predetermined dT/dt is identified, then the predetermined $E_{Thermal}$ value is adjusted by decreasing the value a certain percentage, preferably about 5 to about 10%. The voltage of the battery is also preferably monitored and if the voltage of the battery over time decreases (−dV/dt), then to thermally dependent open circuit voltage which is predetermined is decreased by about 5 to about 10%. It is preferable that when the open circuit voltage is interrupted, that the open circuit voltage is sampled within about 500 ms of the current interruption. Even more preferably that the open circuit voltage is sampled within 100 to about 200 ms of the interruption of the charging current. Another predetermined indicia to be used in the present invention is a predetermined temperature gradient (ΔT°). Finally, as a safety precaution, a second predetermined open circuit voltage is utilized as an indicator that the charging should be lowered or terminated. Also in the method of the present invention, the predetermined value of $E_{Thermal}$ may be increased up to 5–10% when the charging of the battery is switched to a second stage and there remains 20% or more of the total charging capacity of the battery remaining.

An alternative embodiment of the present invention is a battery charger which is useful for charging a rechargeable battery or cell which is comprised of a power supply which provides charging current to the battery; a charge interrupter which periodically interrupts the charging current; a voltage sensor for sampling the voltage values of the battery during charging as well as during open circuit voltage conditions; a temperature sensor for sampling the temperature of the battery; a data compiler for compiling and analyzing the voltage values and temperatures of the battery to identify an indicator of charge adjustment; and, finally, a charging current adjuster which enables the battery charger to adjust the charging current when the indicator is identified. The data compiler in this embodiment of the preset invention preferably compares the unsteady open circuit voltage to a predetermined thermally dependent open circuit voltage to determine if the unsteady open circuit voltage exceeds the predetermined thermally dependent open circuit voltage. If the unsteady open circuit voltage exceeds the $E_{Thermal}$ of the battery, then the current adjuster adjusts the current of the battery. The indicator which may be used as a signal to adjust, lower or terminate charging may be selected from the group consisting of a thermal gradient, negative value of dV/dt, charging time, and a maximum predetermined open circuit voltage ($V_{max}$). It is preferable that the battery charger of the present invention be used with specific types of batteries, more specifically that the batteries are selected from the group consisting of Nickel-Metal Hydride and Nickel-Cadmium. The battery charger of the present invention also preferably includes a temperature sensor that senses the temperature of the battery over time. Utilizing the temperature in the voltage indicators as a switching indicia is also preferably used in the present invention. If there is a increase in temperature over time the predetermined $E_{Thermal}$ value may be adjusted by about 5–10% and if there is a decrease in voltage over time (dV/dt) which is identified prior to identifying $E_{Thermal}$, the $E_{Thermal}$ is decreased a 5 to about 10%. In the battery charger of the present invention, it is preferable that the charge interrupter interrupt the charging current and then that the open circuit voltage of the battery be sampled within about 500 ms of the current interruption, even more preferably, within 100–200 ms of the charging current being interrupted, and even more preferably, within 250–500 ms of the charging current being interrupted. As in the method, another useful charging indicator is a predetermined temperature gradient so upon recognition of a predetermined temperature gradient the battery charging may be terminated or lowered. Also, another indicator of charging may be in recognition of a second predetermined open circuit voltage that allows the charging current to be terminated. If upon switching to the second stage of the charging, the charging capacity of the battery is 20% or more of the total charging capacity, $E_{Thermal}$ is increased from about 5 to about 10%.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS

Figure 1:
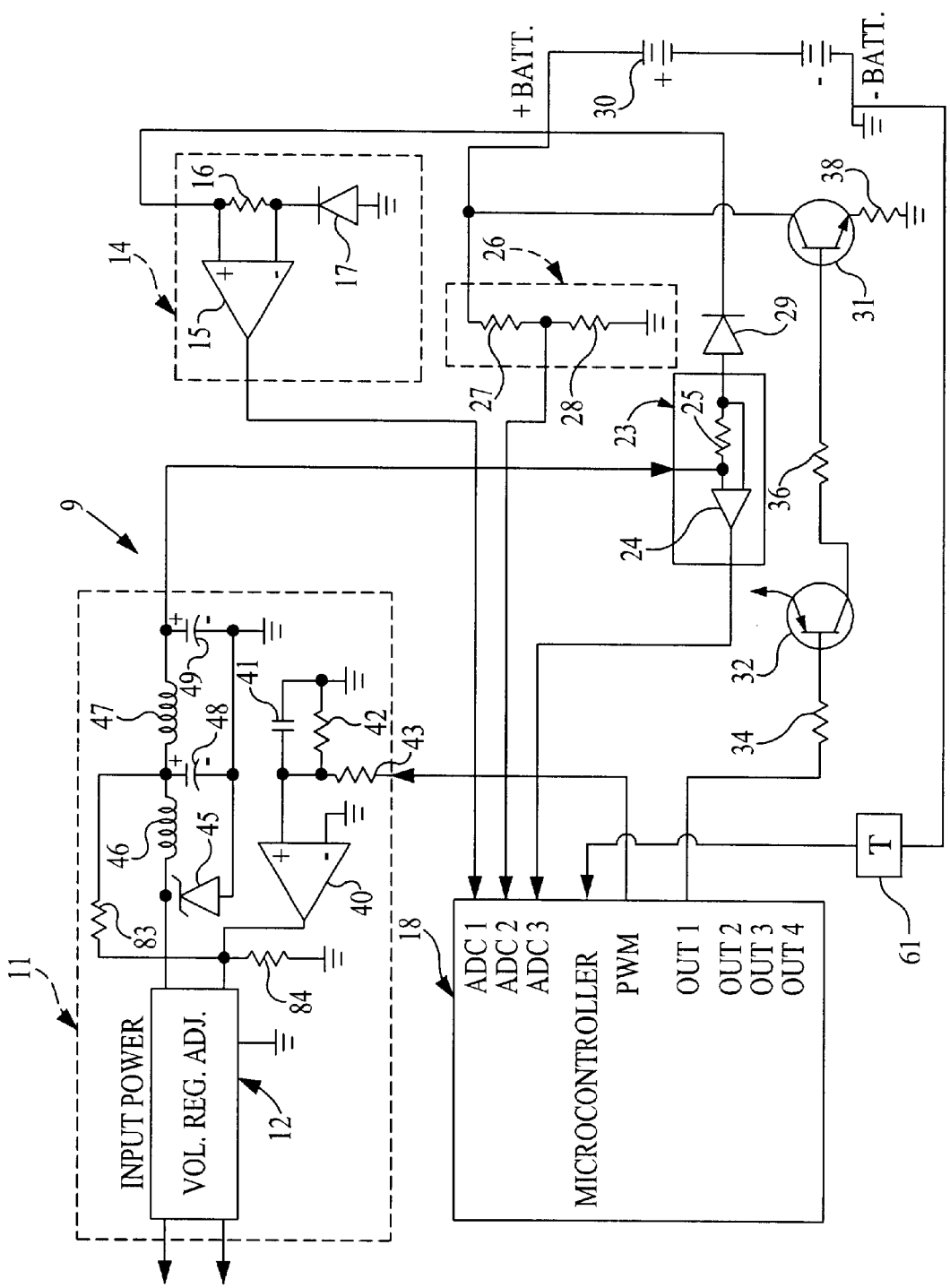
FIG. 1 illustrates a schematic circuit diagram for the preferred embodiment of a battery charger according to the present invention.

It should be noted that in the detailed description which follows, identical components may have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

The battery charger and method of recharging batteries disclosed herein focuses on Nickel-based cells. Although the terms battery and cell can be used interchangeably herein, a battery consists of one or more cells connected in series, or in parallel, or both depending on the desired output voltage and capacity of the battery. The cell is the basic electrochemical unit and consists of the anode, cathode, and electrolyte. When a full state of charge is discussed herein, it is to be understood that battery or cell being charged has reached nearly 100% of the capacity of stored energy, measured in ampere-hours. The rechargeable battery can be any secondary battery or rechargeable battery and preferably for purposes of this invention is a Nickel-Cadmium battery or Nickel-Metal Hydride battery. However, the principles of the present invention can be extended to include other types of rechargeable batteries.

U.S. Pat. No. 5,179,335 teaches use of resistance free voltage for measurement state of charge of rechargeable batteries. It is proposed thereon that open circuit voltage plus an electrochemical polarization value (referred to as an internal resistance free potential) correlate with battery state of charge. It is stated the that "[i]t is important, for proper and precise detection of the internal resistance (IR) free potential, to take the reading after the electrical transient has safely died out, and before the equilibrium of the electrochemical process had time to change. [The] proper delay is in the range of 0.5 to 10 ms, while for most small "flashlight" cells the best value is about 1–3 ms." There appears to be an error in their considerations from chemical a standpoint. Resistance free voltage is the summary of unsteady open circuit voltage ($E_i$) and chemical polarization (CP). There appears to be a failure to recognize that chemical polarization largely depends on cell design, charging current, charging temperature, thickness of electrodes, thickness of separator along with the current value impact on concentration of species.

FIG. 1 illustrates a schematic circuit diagram useful in understanding the present invention. Battery charger 9 is comprised of the necessary elements for achieving the method described herein, and includes a power manager 11 connected to a power supply (not shown). Microcontroller 18 is utilized to control the power manager 11 and receive information through a first voltage feedback circuit 14 from a second voltage feedback circuit 26 and from current feedback circuit 23. Microcontroller 18 is typically comprised of analog/digital converters ADC1, ADC2, ADC3, software or hardware based pulse width modulator (PWM), input/output (I/O) ports OUT1, OUT2, OUT3, OUT4, read only memory and timers. Output voltage is controlled by microcontroller 18 and fed to power manager 11. The output control voltage which is fed to the power manager 11 is filtered by resistors 42 and 43 and capacitor 41 and through the operational amplifier 40.

Using the voltage at the output of operational amplifier 40, first resistor 83 and second resistor 84, the adjustable voltage regulator 12 sets the voltage at diode 45. Inductors 46 and 47, capacitors 48 and 49, and diode 45 are used to filter the voltage. Current feedback is derived by measuring the voltage across shunt 25 using an operational amplifier 24. Diode 29 prevents the introduction of voltage from the battery 30 (i.e., a rechargeable Nickel battery) from being fed back into the charger 9. Voltage feedback from the cells of the battery 30 is provided by voltage feedback circuit 14, comprised of a shunt 16, zener diode 17 and operational amplifier 15. Since zener diode 17 is used, the feedback voltage from the cells of the battery 30 will not be full scale (zero to the battery's maximum voltage) but will be the scale of the zener diode's 17 voltage to the battery's maximum voltage. Voltage feedback from the cells of the battery 30 is provided by voltage feedback circuit 26 comprised of resistors 27 and 28 that form a voltage divider. Transistors 31 and 32 equalize the cells of the battery 30 and support designated current through the battery. The transistors 31 and 32 are under the control of the microcontroller 18. A temperature detector or sensor 61 may be utilized to measure the temperature, T, of the battery and feed this information to the microcontroller. Although not critical to the present invention, the temperature detector may be useful as a safety mechanism to prevent explosive reactions from taking place. The collected information is fed to a microcontroller 18 that cab in turn, signal adjustment or termination of the charging current of power manager 11. The microcontroller 18 is used to run and monitor the operation of the battery charger 9 and to compile and analyze the charging voltage and open circuit voltage values to identify the end of charging of the battery 30. The microprocessor 18 will signal termination of the charging current if the potentials of shunting is identified or if charging is complete. A data compiler may or may not be integrated into microcontroller 18 and may function to compile the charging and open circuit voltage information to thereby minimize the microprocessor time dedicated to this task. Battery charger 9 is presumably precise enough to measure the open circuit voltage within 1 ms of charge interruption to thereby obtain information regarding both the ohmic and chemical polarization components of the cell or battery. The limitation of 1 ms is preferable for measuring the necessary open circuit voltage data points that may be used in various embodiments of the present invention.

Figure 2:
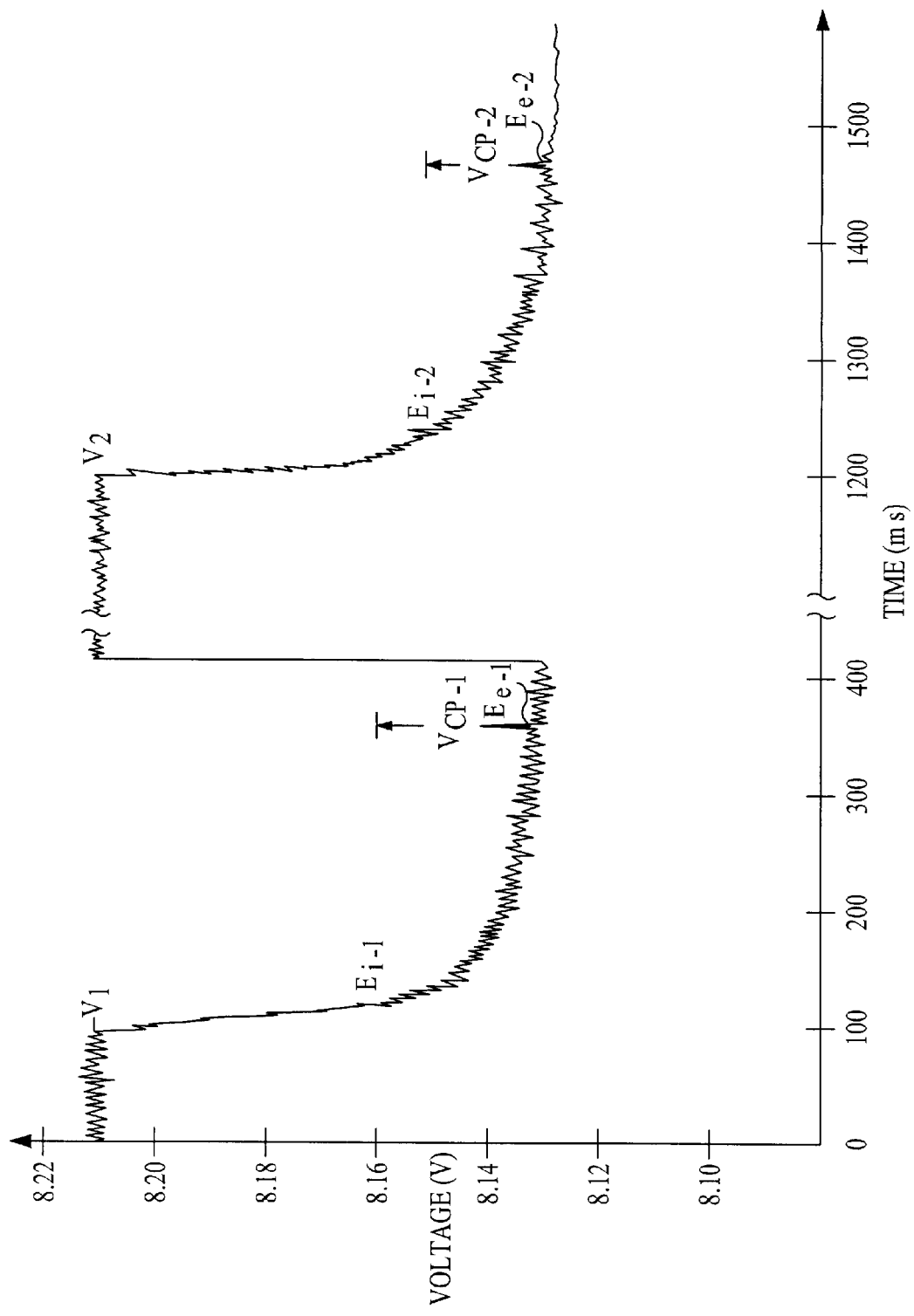
FIG. 2 is a graph illustrating the components of battery voltage interruption.

FIG. 2 illustrates the procedure for sampling unsteady open circuit voltage during the rest period of battery charging. This invention proposes the use of unsteady open circuit voltage for identification of pre-oxygen conditions in a Ni-based battery, which corresponds with 85–95% battery state of charge. The unsteady open circuit voltage is a significant portion of battery voltage. Indeed battery voltage balance can be written as:

$$V = E_e + I(R_{CP} + R_\Omega) \quad (1)$$

where V is the battery voltage, $E_e$ is the unsteady open circuit voltage, $R_{CP}$ is the chemical resistance due to chemical polarization, and $R_\Omega$ is the ohmic resistance due to the ohmic components of the battery. The chemical resistance includes the electrochemical and diffusion increments of polarization of the electrode and the electrolyte.

The unsteady or quasi-steady open circuit voltage Ee includes the polarization in solid phase of the transition metal oxide electrode. Equation (1) can be rewritten in terms of overvoltage as:

$$V = E_e + V_{CP} + V_\Omega \quad (2)$$

where $V_{CP}$ is the over voltage due to chemical components of the cell and $V_\Omega$ is the over voltage due to ohmic component of the cell. $V_\Omega$ is associated with cell resistance and disappears almost immediately after current interruption. From FIG. 2, it can be seen at $V_{CP}$ ($V_{CP-1}$ in FIG. 2) is the difference between the open circuit voltage in the initial moments after current interruption, $E_i$ (i.e. $E_{i-1}$ in FIG. 2) and unsteady open circuit voltage, $E_e$ (i.e. $E_{e-1}$ in FIG. 2). Initial open circuit voltage, $E_i$, is the sum of the chemical component $V_{CP}$, the "unsteady" open circuit voltage $E_e$ and to some extent the ohmic component $V_\Omega$ of the battery. However, the ohmic component, $V_\Omega$ dissipates so rapidly, that in the range of 1 to 5 ms after current interruption, $E_i$ consists primarily of chemical polarization, $V_{CP}$, and unsteady open circuit voltage $E_e$. After 500 ms, the open circuit voltage can be considered substantially free of both the ohmic and chemical components of the battery.

Figure 3:
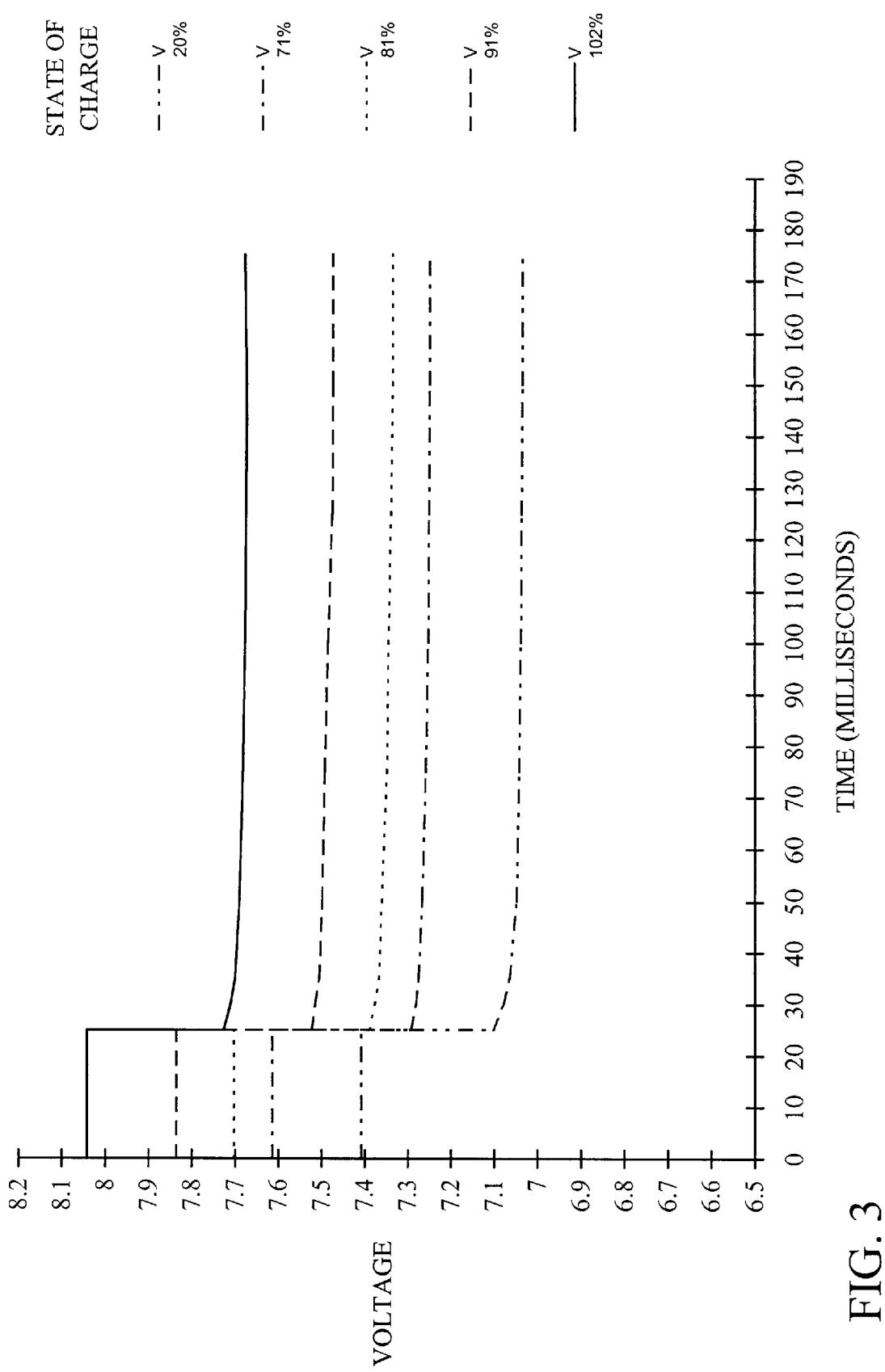
FIG. 3 is a graph illustrating the difference in the circuit voltage for a battery at different states of charge.

In Nickel-based batteries, the battery open circuit voltage value continues to drop on the order of hours after charge termination. This phenomenon is associated with the unsteady processes on the nickel oxide electrode. However, approximately 500 ms is a reasonable time after which chemical polarization has stabilized. The stationary value of open circuit value $E^O_{OCV}$ is equal to 1.31/V for a Nickel-Metal Hydride battery and 1.29/V for a Nickel-Cadmium battery. After 100 ms, chemical polarization and related over voltage, $V_{CP}$, substantially disappears. When using a high rate of charge, the chemical polarization disappears approximately 180 ms after charge termination. The graph of FIG. 3 confirms that an interval of 100–500 ms adequately covers the time necessary to measure the change in chemical polarization. As can be seen from FIG. 3, the chemical polarization disappears after 100 ms for a low state of charge and after 180 ms of continuous current interruption, the chemical polarization almost disappears for a high state of charge. The actual transient time will depend on battery design, state of charge, and temperature.

During the process of chary Ni—MeH and Ni—Cd batteries, heat dissipates per equation:

$$W = VI - E^T I + E^T I_O \quad (3)$$

where V is the charging voltage. $E^T$ is thermoneutral potential (enthalpy per one Coulomb 1.45V for Ni—Cd; 1.35V for Ni—MeH) or enthalpy and $I_O$ is the current of oxygen production (or conversely consumption). Since the stable open circuit value for Ni—Cd (1.29V) and Ni—MeH (1.31V) are known, the difference between the thermoneutral potential and the stable open circuit voltage ($E^O_{OCV} - E^T$) is proportional to the cell's entropy. For a Nickel-Metal Hydride battery, the product of the entropy referred to as one coulomb is equal to 0.04V and for Nickel-Cadmium batteries, the entropy value is equal to 0.16V.

The heat generation prior to oxygen production depends on the difference between charging voltage and thermoneutral potential value per equation:

$$W = (V - E^T) * I \quad (4)$$

Considering that $E^T$ for Ni—MeH is less than $E^T$ for Ni—Cd, and charging voltage is roughly the same for both chemistries, Ni—MeH battery experiences much more heat dissipation during the process of charging than that of Ni—Cd batteries.

It is very important that battery temperature effected first of all chemical polarization value and very slightly effect on steady open circuit voltage. Moreover, the dependence between $E_e$ and temperature can be calculated and taken into consideration as per present the present invention.

Relying on a thermally related open circuit value ($E_{Thermal}$) provides an alternate and more preferred embodiment of the present invention by allowing a charging methodology to be developed which utilizes the "unsteady" open circuit voltage and accounting for its thermal dependence.

Accordingly, this embodiment of the present invention provides a precise charging method for sealed Ni—MeH or Ni—Cd batteries free from disadvantages of the related art. For these purposes, the battery is charged with pulse current and a rest period is used for sampling the unsteady open circuit voltage values $E_i$. The battery is preferably charged up to a predetermined ultimate value of thermal related unsteady open circuit voltage ($E_{Thermal}$), and then current is tapered and battery charge continues up to a second point of termination. A second termination point can be used as a preselected value of temperate gradient, negative value of dV/dt, charging time, or second preselected value of open circuit voltage.

To properly set the $E_{Thermal}$ value, the present invention proposes a procedure for correcting the $V_{OCV}$, switching point value in order to obtain the proper $E_{Thermal}$. This correction procedure is preferably based on the dT/dt or dV/dT termination methods associated with battery overheating attributed to oxygen consumption at a full state of charge. If proposed charging termination as per $E_{Thermal}$ value occurs before dT/dt or dV/dt signals, it means that upper value is properly set and charging is terminated until oxygen production. The capacity when predetermined dT/dt or dV/dt happens is specified as charging capacity ($C_{ch}$).

The time interval of second stage can be used as criteria for the right choice of a low value of $V_{OCV}$ switching point. Preferably, the maximum capacity of second stage is specified as 20% of total charging capacity ($C_{ch}$). If second stage duration is more than that value, the $E_i$ value for switching point should be increased. Also, there are preferably two criteria for $E_i$ switching point. The proper switching point $E_{Thermal}$ should provide charging capacity C, which meets the requirement:

$$0.8 C_{ch} < C < C_{ch} \quad (5)$$

The back up features for termination that can be used way be ultimate time, maximum battery temperature, and/or dT/dt or dV/dt signals.

The unsteady open circuit voltage, which reflects the processes in solid phase of nickel-oxide electrode depend on the potential in the solid phase of nickel-oxide electrode. The later depends on temperature and battery state of charge. The inequality (equation (5)) can make right choice of $E_1$ switching points in spite of these compliances.

The value of $E_{Thermal}$ switching point is not a stationary value, which is sampled at the end of the rest period. The duration of rest period is 100 ms<t<2000 ms. This interval is long enough to exclude the ohm and most chemical components of polarization, and short enough for real scale measurements.

The $E_{Thermal}$ value depends on temperature. This embodiment accounts or calculates temperature dependence of $E_{Thermal}$. The theoretical dependence of ultimate $E_{Thermal}$ from temperature expressed as:

$$E_{Thermal} = E^T (dE_i/dT) \quad (6)$$

In this formula, $E^T$ is the thermoneutral potential (enthalpy per one Coulomb) and $dE_i/dT$ is entropy change per one Coulomb during charging-discharging processes of nickel-metalhydride chemistry. The product of entropy and temperature is equal to –0.040V at 25° C. for nickel-metalhydride chemistry and –0.16V for nickel-cadmium chemistry during charging process. It means that the thermodynamically temperature coefficient for OCV for NiMeH chemistry is:

$$dE_i/dT = -0.04/25 = -0.0016 V/°C. \quad (7)$$

For Ni—Cd chemistry, the thermodynamically temperature coefficient for OCV is $dE_i/dT$ equal to 0.00064 V/° C.

The negative value of temperature coefficient means that the OCV value drops with increasing temperature. This value gives us the order of magnitude.

It is more preferred to take into consideration the kinetic factors as well. The chemical polarization, which can be part of unsteady OCV, also drops with temperature and experimental temperature coefficient of OCV (with thermodynamic and kinetic considerations) can be estimated as 0.0016<β<0.08 V/° C.

From this stand point, the temperature related formula for ultimate value of OCV may be written as:

$$E_{Thermal}(T) = E_{Thermal}(25) - (T-25)(\beta) \quad (8)$$

In formula (8), $E_{Thermal}(T)$ is the ultimate OCV at maximum state of charge and temperature T and $E_{Thermal}(25)$ is the ultimate OCV at 25° C.

We call use this formula for setting up the $E_t(T)$ value based on experimental determinate $E_{Thermal}(25)$ value.

After setting $E_{Thermal}(T)$, we can make a correction in the process of operation as per equation (6).

The battery chosen for verification of the proposed invention includes six (6)0.65 Ah prismatic NiMeH Toshiba cells connected in series.

The proposed two step charging algorithm is verified with charging and discharging cycles at difference temperatures, states of charge and charging currents.

The cycle test is set up in order to prove battery stability by use of the proposed algorithm.

Formula:

$$E_{Thermal}(T) = [1.45 - (T-25) \times 0.002]/\text{cell (V)} \quad (9)$$

is used for the ultimate value of $E_{Thermal}$ related with temperature as analog for formula (8). This formula sets an initial value of $E_{Thermal}$ that can be adjusted as per above mentioned procedure. This value for a 5 cell battery when inputted into formula (9) yields:

$$E_{Thermal}(T) = [7.25 - (T-25) \times 0.01]/\text{battery (V)} \quad (10)$$

Figure 4:
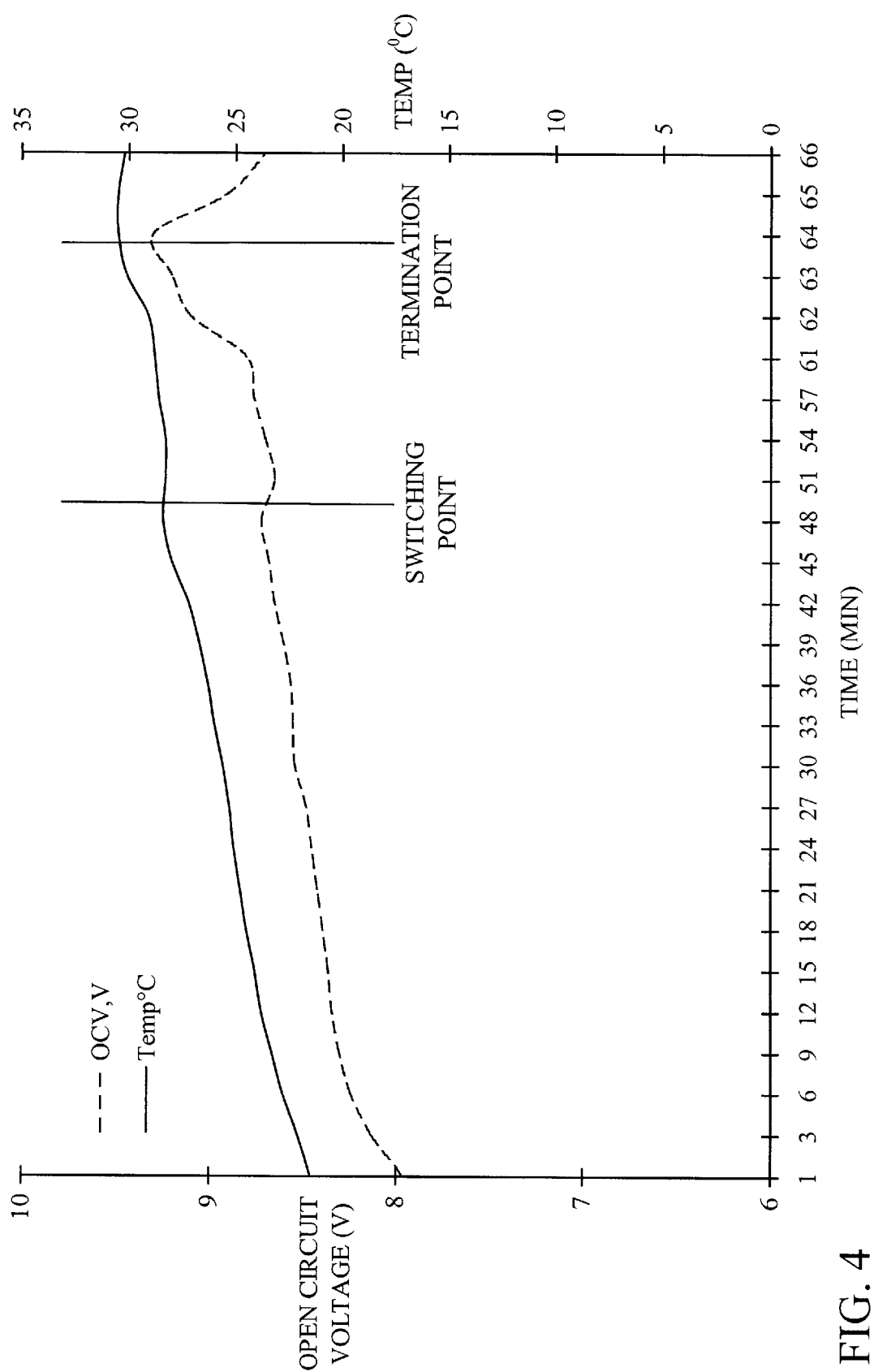
FIG. 4 is a graph illustrating the open circuit voltage value versus time and state of charge for a nickel-metalhydride battery.

FIG. 4 illustrates the voltage and temperature profile by the proposed method of charging Ni—MeH battery.

The first charging stage is provided at current 0.65 A (1C) up to $E_t(T)$ value as per formula (9) for a 6 cell battery, which makes the $E_t(T)$ equal to 8.6V. The second stage is provided at current 0.3 A (C/2) rate up to the temperature gradient. The ambient temperature is 25° C. in this experiment.

The maximum charging temperature is 32° C. and discharging capacity is 90% rated capacity.

The maximum charging temperature and discharging capacity for regular charging profile and dT/dt termination method are 39° C. and 88%

This difference in final temperature is very significant with cycle life point of view.

Figure 5:
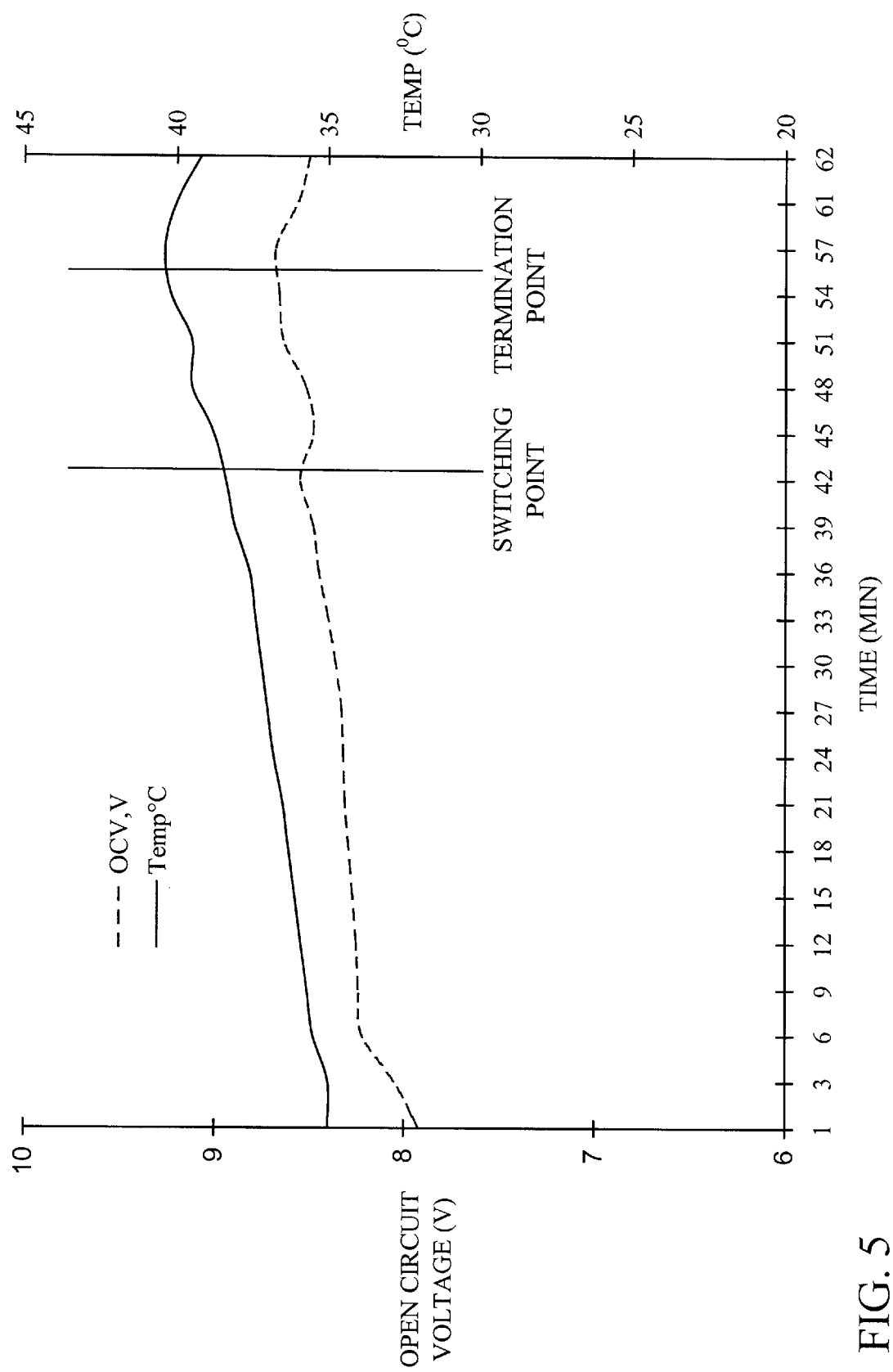
FIG. 5 is a graph illustrating the open circuit voltage value versus time and state of charge for a nickel-cadmium battery.

FIG. 5 illustrates to same parameters as FIG. 4 when the ambient temperate is equal 35° C. The difference in ambient temperature does not impact on battery operation.

Figure 6:
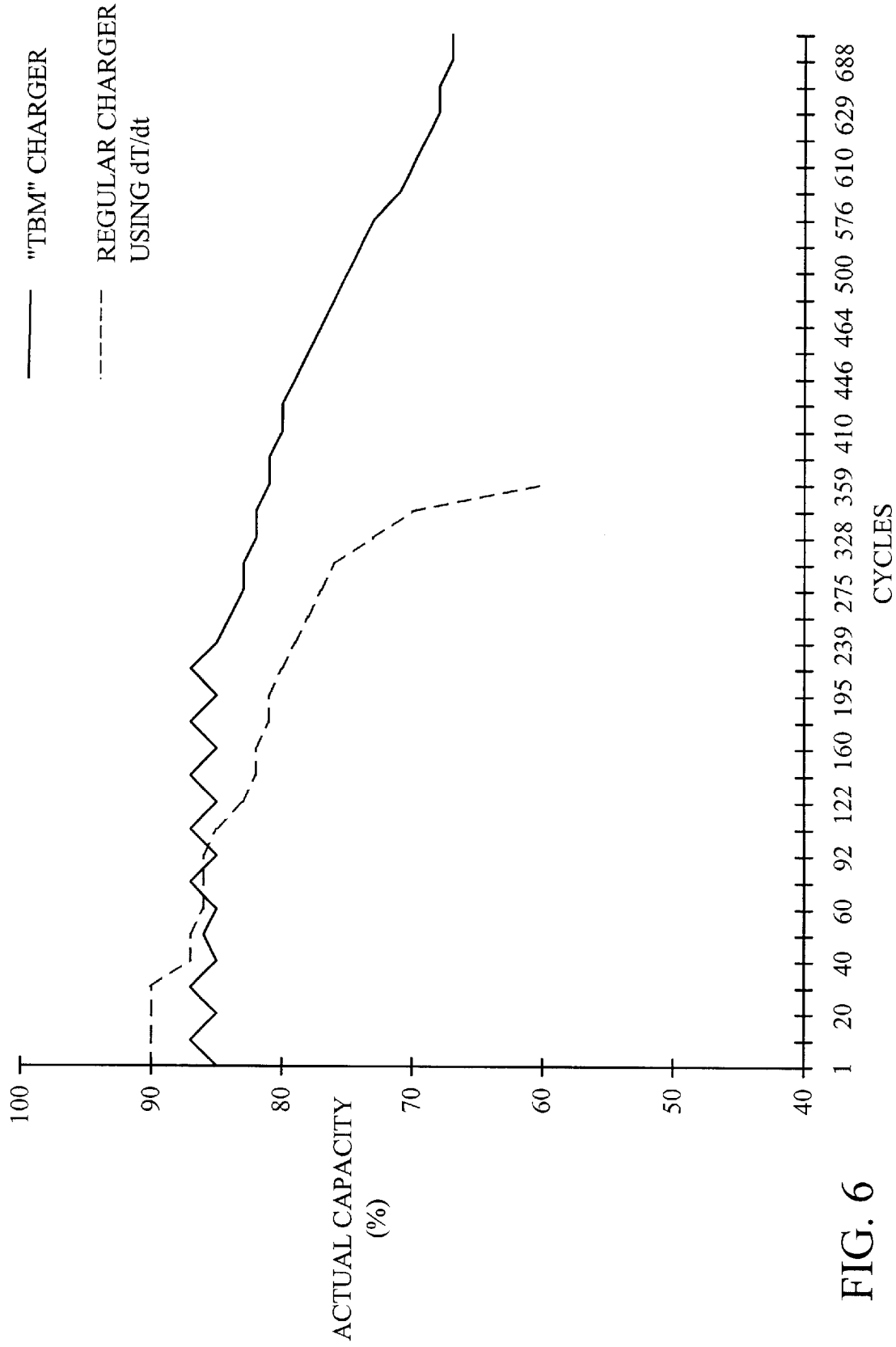
FIG. 6 is a graph illustrating the capacity data vs. cycle life of a 7.2 V, 0.6 Ah Toshiba Ni—MeH battery charged according to a dT/dt algorithm as compared to an algorithm in accordance with the present invention.

FIG. 6 illustrates the capacity data vs. Cycles for a cycle life test for a Ni—MeH Toshiba battery. When the proposed charging algorithm is used during cycle life: battery is charged up to OCV as per formula (10) at current 1.1 C for the first step and with 0.4 C rate for second step. Discharge current is 0.65 A (1 C rate).

The proposed charging method increases cycle life of a nickel metal-hydride battery two fold when compared with a regular charging algorithm.

Although the preferred embodiments have been described in detail, it should be understood that the various changes, substitutions and alterations can be made without departing from the spirit and scope of the invention as defined by the appended claims. Specifically, combining one or more of the methods of charge termination and method of chemistry type recognition in a battery charge or a method of charging a battery is within the scope of the claims.

What is claimed is:

1. A method of charging a rechargeable battery comprising:

charging the battery with a charging current;

sampling an open circuit voltage of the battery;

lowering the charging current if the open circuit voltage reaches or exceeds a predetermined thermally dependant open circuit voltage ($E_{Thermal}$); and continuing charging with the charging current until a predetermined charging condition is identified.

2. The method of claim 1, further including the step of monitoring the temperature of the battery over time.

3. The method of claim 1, further including the steps of monitoring for an increase in temperature over time (+dT/dt) and decreasing the predetermined thermally dependent open circuit voltage.

4. The method of claim 1, wherein the predetermined thermally dependent open circuit voltage is decreased by about 5 to about 10% if a decrease in voltage over time (−dV/dt) is identified.

5. The method of claim 1, wherein the open circuit voltage is sampled within about 500 ms of current interruption.

6. The method of claim 5, wherein the open circuit voltage is within 100–200 ms of the charging current being interrupted.

7. The method of claim 1, wherein the predetermined charging condition is a predetermined temperature gradient (ΔT°).

8. The method of claim 1, wherein the predetermined charging condition is a second predetermined open circuit voltage.

9. The method of claim 1, wherein the predetermined thermally dependent open circuit voltage is increased up to 5–10%, if charging capacity of the battery after switching to second stage is more than 20% of total charging capacity.

10. A battery charger for charging a rechargeable battery or cell comprising:

a power supply to provide charging current to said battery or cell;

a charge interrupter for periodically interrupting the charging current;

a voltage sensor for sampling voltage values of the battery;

a temperature sensor for sampling temperature of the battery;

a data compiler for compiling and analyzing the voltage values and temperature of the battery to indent an indicator of charge adjustment; said indicator being identified when an unsteady open circuit voltage exceeds a predetermined thermally dependent open circuit voltage; and a charging current adjuster for adjusting the charging current when the indicator is identified.

11. The battery charger of claim 10, wherein the indicator is selected from the group consist of a thermal gradient, charging time, negative value of dV/dt, and maximum predetermined open circuit voltage ($V_{MAX}$).

12. The battery charger of claim 10 wherein the type of battery is selected from the group consisting of Nickel-Metal Hydride and Nickel-Cadmium batteries.

13. The battery charger of claim 10, wherein the temperature sensor senses temperature of the battery over time.

14. The battery charger of claim 13, wherein an increase in temperature over time (+dT/dt) indicates a need to decrease the predetermined thermally dependent open circuit voltage by about 5 to 10%.

15. The battery charger of claim 10, wherein the predetermined thermally dependent open circuit voltage is decreased by about 5 to about 10% if a decrease in voltage over time (−dV/dt) is identified prior to identifying predetermined thermally dependent open circuit voltage.

16. The battery charger of claim 10, wherein the open circuit voltage is sampled within about 500 ms of current interruption.

17. The battery charger of claim 10, wherein the open circuit voltage is sampled within 100–200 ms of the charging current being interrupted.

18. The battery charger of claim 10, wherein charging is terminated upon recognition of a predetermined temperature gradient (ΔT°).

19. The battery charger of claim 10, wherein charging is terminated upon recognition of a second predetermined open circuit voltage.

20. The battery charger of claim 10, wherein the predetermined thermally dependent open circuit voltage is increased up to 5–10% when the charging capacity of the battery, after switching to second stage, is more than 20% of total charging capacity.

* * * * *